(12) United States Patent
Hecker et al.

(10) Patent No.: US 8,056,402 B2
(45) Date of Patent: Nov. 15, 2011

(54) NANOPROBE TIP FOR ADVANCED SCANNING PROBE MICROSCOPY COMPRISING A LAYERED PROBE MATERIAL PATTERNED BY LITHOGRAPHY AND/OR FIB TECHNIQUES

(75) Inventors: Michael Hecker, Reichenberg (DE); Ehrenfried Zschech, Moritzburg (DE); Piotr Grabiec, Osowiec (PL); Pawel Janus, Brwinów (PL); Teodor Gotszalk, Wroclaw (PL)

(73) Assignee: Advanced Micro Devices, Inc., Austin, TX (US)

( * ) Notice: Subject to any disclaimer, the term of this patent is extended or adjusted under 35 U.S.C. 154(b) by 714 days.

(21) Appl. No.: 12/114,121

(22) Filed: May 2, 2008

(65) Prior Publication Data

US 2009/0114000 A1    May 7, 2009

(30) Foreign Application Priority Data

Nov. 5, 2007  (DE) .......................... 10 2007 052 610

(51) Int. Cl.
*G01B 5/28* (2006.01)
(52) U.S. Cl. .......................................................... 73/105
(58) Field of Classification Search .................... None
See application file for complete search history.

(56) References Cited

U.S. PATENT DOCUMENTS

| | | | |
|---|---|---|---|
| 5,336,369 A | 8/1994 | Kado et al. .................. 156/659.1 |
| 5,929,438 A | 7/1999 | Suzuki et al. ................... 250/306 |
| 6,328,902 B1 * | 12/2001 | Hantschel et al. .................. 216/2 |
| 6,862,921 B2 | 3/2005 | Chand et al. ....................... 73/105 |
| 7,010,966 B2 | 3/2006 | Kitazawa et al. ................... 73/105 |
| 2002/0024004 A1 * | 2/2002 | Shimada et al. ................... 250/216 |
| 2002/0152804 A1 | 10/2002 | Shiotani et al. ...................... 73/105 |
| 2007/0033993 A1 * | 2/2007 | Fouchier ........................... 73/105 |

FOREIGN PATENT DOCUMENTS

| | | |
|---|---|---|
| EP | 1 748 447 A1 | 1/2007 |
| WO | WO 99/58925 | 11/1999 |

OTHER PUBLICATIONS

Translation of Official Communication from German Patent Office for German Patent Application No. 10 2007 052 610.7 dated Nov. 3, 2008.

* cited by examiner

*Primary Examiner* — Hezron E Williams
*Assistant Examiner* — Alex Devito
(74) *Attorney, Agent, or Firm* — Williams, Morgan & Amerson, P.C.

(57) ABSTRACT

By forming an appropriate material layer, such as a metal-containing material, on a appropriate substrate and patterning the material layer to obtain a cantilever portion and a tip portion, a specifically designed nano-probe may be provided. In some illustrative aspects, additionally, a three-dimensional template structure may be provided prior to the deposition of the probe material, thereby enabling the definition of sophisticated tip portions on the basis of lithography, wherein, alternatively or additionally, other material removal processes with high spatial resolution, such as FIB techniques, may be used for defining nano-probes, which may be used for electric interaction, highly resolved temperature measurements and the like. Thus, sophisticated measurement techniques may be established for advanced thermal scanning, strain measurement techniques and the like, in which a thermal and/or electrical interaction with the surface under consideration is required. These techniques may be advantageously used for failure localization and local analysis during the fabrication of advanced integrated circuits.

8 Claims, 8 Drawing Sheets

NANOPROBE TIP FOR ADVANCED SCANNING PROBE MICROSCOPY COMPRISING A LAYERED PROBE MATERIAL PATTERNED BY LITHOGRAPHY AND/OR FIB TECHNIQUES

BACKGROUND OF THE INVENTION

1. Field of the Invention

Generally, the present disclosure relates to metrology in the manufacturing of microstructures, such as integrated circuits, and, more particularly, to the measurement of the surface characteristics of microstructure features by means of scanning probe microscopy (SPM) for determining surface and near-surface characteristics with nanometer resolution.

2. Description of the Related Art

In manufacturing microstructures, such as integrated circuits, micromechanical devices, opto-electronic components and the like, device features, such as circuit elements, are typically formed on an appropriate substrate by patterning the surface portions of one or more material layers previously formed on the substrate. Since the dimensions, i.e., the length, width and height, of individual features are steadily decreasing to enhance performance and improve cost-effectiveness, these dimensions have to be maintained within tightly set tolerances in order to guarantee the required functionality of the complete device. Usually a large number of process steps have to be carried out for completing a microstructure, and thus the dimensions of the features during the various manufacturing stages have to be thoroughly monitored to maintain process control and to avoid further cost-intensive process steps owing to process tools that fail to meet the specifications in an early manufacturing stage. For example, in highly sophisticated CMOS devices, the gate electrode, which may be considered as a polysilicon line formed on a thin gate insulation layer, is an extremely critical feature of a field effect transistor and significantly influences the characteristics thereof. Consequently, the size and shape of the gate electrode has to be precisely controlled to provide the required transistor properties. Thus, great efforts are being made to steadily monitor the dimensions of the gate electrode. However, for highly scaled microstructures, the surface characteristics of the materials used also increasingly become important aspects for enhancing performance and reliability of the devices and/or for reducing yield loss and the like. For example, the detection of grain sizes, micro-cracks, adhesion characteristics and elastic properties may be important for the performance and reliability of the devices, especially when highly scaled microstructure devices are considered. By way of example, in metallization layers of advanced integrated circuits, the adhesion characteristics may significantly affect the mechanical strength during the manufacturing process and may also determine the reliability of the finished device while also the crystallinity of the metal influences the current drive capability and thus the performance of the device. Moreover, the formation of well-understood interfaces between two different materials is an important aspect and may therefore require reliable measurement data of surface characteristics.

Consequently, there was a growing need for techniques which may be able to characterize materials and in particular their engineered surfaces with a spatial resolution that is appropriate for highly scaled microstructures, such as integrated circuits. Frequently used and very powerful tools in this respect are the atomic force microscope (AFM) and the scanning tunnel microscope (STM) which allow the characterization of nano-structured materials by scanning an appropriate tip of a cantilever across a sample surface. During the scan operation, typically the charge cloud of the tip interacts with respective charge clouds of the sample surface, wherein the corresponding interaction, i.e., the minimal displacements of the tip or the tunnel current, are recorded to obtain information on the surface structure with a nanometer resolution. Thus, scanning probe microscopy provides a three-dimensional image of the surface topography, which may provide precious information with respect to the surface structure of the sample. When imaging a sample surface with high spatial resolution, respective surface portions within an area of a few micrometers or smaller may appear almost atomically flat so that the corresponding image obtained by means of the scanning probe microscope may include less contrast and thus may not allow efficient extraction of detailed information on surface characteristics at this high resolution, although on a broader scale a significant sample topography may be present.

Therefore, a plurality of probing techniques have been developed, in which image contrast and thus extraction of details of small areas of interest may be efficiently enhanced by initiating an interaction of the probe with the sample surface, by, for instance, exciting the sample surface with sound waves, wherein ultrasonic sound with frequencies up to several MHz may be used. In this case, the tip of the probe may act as a means for interacting with the surface and also as a detector for recording the response of the surface to the excitation. However, many other mechanisms have been developed to interact with the sample surface based on the principle of using the highly local influence of the tip of a scanning probe on the sample surface. For instance, an electric field may be created or modified in a highly localized manner, which may be advantageously used in strain measurement techniques.

Recently, strain-inducing techniques have been established in an attempt to further enhance performance of silicon-based circuit elements, since strained silicon exhibits a modified charge carrier mobility compared to non-strained silicon. For this reason, various techniques have been proposed for creating a specific type and magnitude of strain in the channel regions of silicon-based field effect transistors to obtain enhanced drive current capability and thus switching speed. The strain in the channel regions and/or other transistor areas may have to be specifically applied for the different transistor types, such as N-channel transistors and P-channel transistors, since the type of strain that enhances performance of one type of transistor may result in performance degradation in another type of transistor. Thus, sophisticated strategies may be required to create the desired type and magnitude of strain in a highly localized manner, thereby also calling for advanced measuring techniques that may allow the determination of strain characteristics in a spatially resolved manner at high precision and reliability. In this respect, Raman spectroscopy has been proven to be a viable candidate, since internal strain may be determined on the basis of the shift of spectral lines. It has been demonstrated that the sensitivity of this metrology technique may be greatly enhanced by locally modifying the electric field at the surface portion under consideration by positioning a probe having a tip that may interact with the surface to achieve the desired modification of the local electric field.

In other cases, the temperature distribution may have to be determined with high spatial resolution, which may require a thermal and electrical probe that, however, should not significantly affect the temperature of the surface portion to be measured, thereby requiring a thorough balancing of thermal conductivity characteristics and low overall mass at appropriate mechanical stability of the nano-probe.

Thus, since the introduction of STM and AFM techniques, a multitude of nano-probes have been developed on the basis of modifications of the initial concept, thereby resulting in a plurality of new analytical techniques. For each of these analytical tools used for the determination of various surface-specific characteristics, a specific nano-probe has to be manufactured in such a way that a tip portion that is connected to an appropriate cantilever provides the possibility for an interaction with the sample surface to be examined on the basis of nanometer dimensions. For this purpose, typically a tip portion with a nano-sized curvature of the apex may be formed by wet or dry etching of an appropriate structural material, such as silicon, by, for instance, taking advantage of the different etch characteristics of different crystallographic orientations for certain etch chemistries. Thus, depending on the basic lithography and etch techniques used, the tip portion of the nano-probe may be manufactured in an appropriate shape as required for the mechanical probing of the surface under consideration. That is, the nano-probes formed on the basis of well-established lithography and etch techniques may be used as nano-mechanical "interfaces" interacting with the surface portion under consideration, thereby meeting the requirements for a wide class of applications, in which the mechanical interaction represents the main aspect of the analytical technique of interest. In other applications, however, additional requirements beyond the pure mechanical interaction have to be taken into consideration. For electrical nano-probing for measurement techniques requiring electrical interaction with the sample surface, the tip portion has to be conductive and also requires appropriate connections with the cantilever portion for signal propagation.

In other aspects involving thermal characteristics of the surface under consideration, as previously mentioned, even more challenging requirements of such a nano-probe have to be taken into consideration. For example, a corresponding probe requires, in addition to the nano-size tip portion to be in contact with the sample, a transducer portion enabling the measurement of the temperature has to be provided at the apex of the tip portion, while, at the same time, the thermal mass has to be as small as possible to reduce the overall response time and also maintain a thermal influence on the surface portion to be measured at a low level. Moreover, thermal conditions occurring in the vicinity of the tip portion should not significantly affect the measurement results obtained by the interaction of the tip portion with the sample surface. For example, heating of the cantilever portion by the laser used to detect the minute deflections of the cantilever portion caused by the interaction of the tip portion with the sample surface should not significantly modify the actual thermal measurement results.

Thus, a plurality of promising analytical techniques are available on the basis of scanning probe microscopy techniques, which may be used for estimating materials and manufacturing techniques applied for the manufacturing of microstructural devices, such as advanced integrated circuits, wherein, however, the fabrication of appropriate nano-probes on the basis of conventional strategies may reduce the overall efficiency of these promising analytical tools.

The present disclosure is directed to various methods and devices that may avoid, or at least reduce, the effects of one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the subject matter disclosed herein relates to enhanced techniques for the fabrication of nano-probes to obtain respective devices for sophisticated analytical scanning probe microscopy techniques, wherein the probes may be formed with a high degree of uniformity and with a high degree of flexibility with respect to the shaping of the probes. Furthermore, the techniques disclosed herein enable the selection of a wide class of materials for the tip portions of the nano-probes, which, in turn, provides the possibility of adjusting the characteristics of the probe under consideration with respect to the analytical task to be fulfilled, wherein, in combination with enhanced flexibility in shaping the tip portions and in view of the highly uniform process technique, a plurality of scanning probe measurement strategies may be employed as standard metrology strategies during the complex manufacturing process for forming microstructure devices. For this purpose, a probe material may be provided in the form of a layer material on an appropriate carrier material and may be subsequently patterned, which, in some illustrative aspects disclosed herein, may be accomplished on the basis of lithography and/or highly directional particle bombardment, such as a focused ion beam, to obtain the desired shaping of the tip and a cantilever portion connected thereto. Furthermore, the portions of carrier material may be appropriately removed to "expose" or release the cantilever portion and the tip portion. Thus, a wide variety of materials, such as metals, highly doped semiconductor materials, dielectric materials and the like, may be used for the tip portion and the cantilever connected thereto, while the remaining substrate material may be efficiently used as a mechanical support and thus as a remaining cantilever, the deflection of which may be detected on the basis of optical techniques, wherein the required optical characteristics of the substrate material, such as reflectivity and the like, may be efficiently adjusted. Furthermore, for electrically conductive materials, an appropriate interconnection structure may be formed during the patterning of the tip portion and the cantilever portion, thereby further enhancing the flexibility and reliability of the manufacturing technique and thus of the resulting nano-probes. In some illustrative aspects disclosed herein, the carrier material may be pre-processed to obtain a "template" structure prior to providing the probe material, wherein the template structure may act as a "mold" for the probe material, at least in the tip portion, thereby efficiently defining the basic configuration of the tip portion so that, for instance, the degree of tapering of the tip portion, an inclination angle of the probe material with respect to the cantilever portion, and the like may be defined with high uniformity for a plurality of probes on the basis of well-established three-dimensional microstructuring technologies, as may be used for conventional MEMS (microelectronic mechanical structures) or conventional mechanical nano-probes.

One illustrative method disclosed herein relates to the formation of a probe and comprises providing a substrate having formed thereon a layer of probe material. Furthermore, a tip portion and a cantilever portion are formed in the probe material and additionally a part of the substrate is selectively removed to provide the tip portion and the cantilever portion to extend from a remaining part of the substrate.

A further illustrative method disclosed herein comprises providing a substrate having a surface for forming a cantilever portion thereon, wherein the substrate further comprises a template structure extending from the surface, and wherein the template structure defines an edge extending from the surface. The method further comprises forming a probe material above the surface and the template structure and patterning the probe material to form a cantilever portion on a part of the substrate and a tip portion connected to the cantilever portion, wherein the tip portion extends along the edge defined by the template structure. Finally, the method comprises selectively removing the template structure and a part of the substrate corresponding to the cantilever portion.

One illustrative probe for scanning probe microscopy disclosed herein comprises a cantilever portion connected to a substrate and extending therefrom, wherein the cantilever portion comprises a first probe layer portion having a specified thickness. Furthermore, the probe comprises a tip portion connected to the cantilever portion, wherein the tip portion is comprised of a second probe layer portion that also has the specified thickness.

BRIEF DESCRIPTION OF THE DRAWINGS

The disclosure may be understood by reference to the following description taken in conjunction with the accompanying drawings, in which like reference numerals identify like elements, and in which.

Figure 1A:
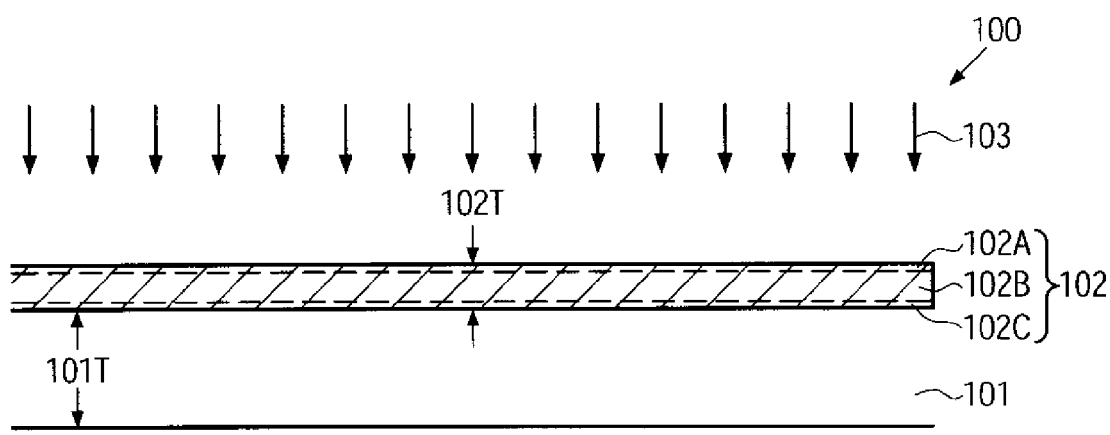
FIGS. 1a-1b schematically illustrate cross-sectional views of a substrate material having formed thereon a layer of probe material prior to patterning the probe material on the basis of lithography and/or focused ion beam (FIB) techniques, according to illustrative embodiments.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the subject matter disclosed herein relates to enhanced techniques for forming nano-probes in a highly efficient manner by providing enhanced process and, thus, device uniformity in combination with increased flexibility in selecting the shape and the material characteristics of the tip portion. For this purpose, in some illustrative embodiments, a probe material may be formed on an appropriate substrate material, which may be accomplished based on well-established deposition techniques or surface treatment, which therefore enables the utilization of specifically designed materials in view of the specific task of the nano-probe under consideration. Based on the probe material provided on the substrate material, the contour or shape of the tip portion and a portion of the cantilever connected to the tip may be defined on the basis of appropriate techniques, such as "etching" by particle bombardment, for instance in the form of a focused ion beam (FIB), in which ions may be focused on a material surface under consideration, thereby resulting in material removal by physical interaction so as to sputter particles off the target material, wherein interaction with the target material is substantially restricted to a beam spot of the focused ion beam. Consequently, by providing an appropriate scan motion with respect to the focused ion beam, the probe material may be "cut" and thus removed with high spatial resolution, thereby enabling an efficient shaping of the deposited material. Thus, the contour of the tip portion may be defined with high precision and uniformity as a two-dimensional layer portion, wherein other characteristics, such as thermal and electrical conductivity and the like, may be adjusted on the basis of the material characteristics and the overall configuration, i.e., the layer thickness of the probe material, the amount of material provided in the tip portion and the like. Prior to performing respective patterning processes, or at least after the patterning processes or after the patterning of the sheet material, a desired portion of the substrate material may be removed, for instance, on the basis of selective etch techniques, in order to provide a cantilever portion and the tip connected thereto as a free-standing configuration extending from the remaining substrate material.

In this way, a "two-dimensional" nano-probe may be provided in which the material characteristics, as well as the outer contour and possibly an inner structure, for instance, created by selectively removing material from within the outer contour of the tip portion, may be defined on the basis of the requirements of a specific type of analytical task or a desired type of interaction with a surface portion, as may, for instance, be used for advanced strain measurement processes on the basis of Raman spectroscopy and the like, as previously explained. In other cases, highly efficient thermal nano-probes may be created, wherein the thermal characteristics may be defined on the basis of the material used and the cross-section of segments defining the apex of the tip, thereby providing an efficient transducer structure while also having the possibility of adjusting the overall amount of material in the tip portion and in the cantilever portion connected thereto, thereby restricting, for instance, a thermal influence caused by the laser beam on the measurement site under consideration when optically detecting the deflection of the cantilever upon interaction of the tip with the sample surface. The patterning on the basis of a particle bombardment of high spatial resolution may, in some embodiments, be assisted by conventional lithography techniques in order to appropriately define areas in the probe material, which may be defined on the basis of the resolution capabilities of the lithography technique, thereby enhancing the overall process throughput.

In other illustrative aspects disclosed herein, a "three-dimensional" configuration of the cantilever portion and the tip portion may be obtained by using a "template" structure that may be formed on the basis of well-established microstructuring techniques in an appropriate substrate material, for instance, by providing a respectively configured recess or a mesa protruding from the surface under consideration, wherein the template structure may be subsequently coated with any appropriate material that may then be patterned to define the contour of the tip portion. The patterning of the tip portion may, in some illustrative embodiments, be accomplished on the basis of lithography techniques and using the characteristics of the template structure, which may comprise a sharp edge, for instance, defined by crystallographic planes of the substrate material, which may be transferred or "imaged" into the coating material, thereby also defining a sharp tip. Thereafter, the template structure may be removed selectively to the probe material, thereby providing the tip portion and the cantilever portion connected thereto as a non-planar free-standing configuration. Also in this case, the outer shape may be efficiently designed on the basis of the requirements for the nano-probe while a wide class of material may provide the desired electrical, mechanical and thermal characteristics. Moreover, since the template structure, as well as the probe material, may be formed on the basis of well-established microstructure manufacturing techniques, for instance, lithographical definition and etching of the template structure in combination with lithography techniques for patterning the probe material formed on the template structure, the respective nano-probes may be formed in great numbers with a high degree of process uniformity. Furthermore, in some illustrative aspects, the patterning of the three-dimensional tip configuration may be accomplished, additionally or alternatively to lithography techniques, by using a spatially restricted particle bombardment, such as a focused ion beam, wherein an outer contour and/or an inner structure of the tip portion may be adjusted on the basis of a high spatial resolution.

FIG. 1a schematically illustrates a cross-sectional view of a nano-probe 100 in an early manufacturing stage. As shown, the probe 100 may comprise a substrate 101, which may be provided in a form that substantially corresponds to the overall dimensions of the probe 100, while in other illustrative embodiments, the substrate 101 may be provided as a carrier material, such as a wafer and the like, in and on which a plurality of probes have to be formed during the subsequent processing prior to separating individual devices. The substrate 101 may represent any appropriate carrier material for forming thereon a layer of probe material 102 on the basis of any appropriate technique, such as deposition of a required material or material composition, surface treatment, for instance in the form of oxidation, nitration or any other plasma treatment, and the like. For example, the substrate 101 may be provided in the form of a standard substrate as may typically be used for the fabrication of microstructure devices, such as silicon substrates, silicon-on-insulator (SOI) substrates, glass substrates and the like. In this manufacturing stage, the substrate 101 may have any appropriate thickness 101T that provides the mechanical integrity required during the further manufacturing process for forming a nano-probe. It should be appreciated that the substrate 101 may comprise a plurality of different materials, for instance different material layers, in order to provide the desired mechanical and optical characteristics during the operation of the respective probe. For example, in this manufacturing stage, the substrate 101 may have, or receive in a later stage, an appropriate treatment or material to provide a desired degree of reflectivity with respect to a laser radiation of specified wavelength that may be used during operation for detecting a deflection of the probe 100 when interacting with the surface of interest. For this purpose, any appropriate metallic or dielectric material may be used.

Furthermore, as previously indicated, the probe material layer 102 may be provided in the form of a conductive material, which may be comprised of two or more materials, depending on the desired mechanical and chemical characteristics, for instance with respect to corrosion and the like. For instance, when provided as a conductive material, the probe material layer 102 may comprise platinum, gold, silver and the like, which may provide enhanced chemical stability during operation, while other metals may also be used, such as nickel and the like. It should be appreciated that the probe layer 102 may comprise two or more sub-layers in the form of a layer stack, wherein, for instance, one material layer may provide the overall conductivity characteristic while other material layers may provide enhanced stability during the manufacturing process and also during the operation of the probe 100. For example, a material may be coated or may be vertically enclosed by other materials, when the material characteristics of the central material layer may deteriorate upon exposure to environmental conditions and the like. For example, a respective metal suffering from reduced chemical stability during specific environmental conditions may be confined on the basis of more stable materials, such as platinum and the like. In other illustrative embodiments, the probe layer 102 may comprise a protective coating to provide enhanced stability during subsequent manufacturing flow, for instance with respect to etch chemistries and the like, which may be used for patterning the layer 102 and/or the substrate 101 in a later manufacturing stage. For example, as schematically illustrated in FIG. 1a, the probe layer 102 may comprise sub-layers 102A, 102B, 102C in order to adjust the overall material characteristics with respect to stability during operation and/or the manufacturing process. In other illustrative embodiments, the probe layer 102 may be comprised of two or more materials, which may be provided as different layer portions that are positioned laterally adjacent to each other so that the probe 100 in its initial state may comprise two or more laterally adjacent segments having different material characteristics.

The probe 100 in the manufacturing stage as shown in FIG. 1a may be formed on the basis of the following processes. After providing the substrate 101 in any appropriate size, the material characteristics thereof may be adjusted, for instance, by adjusting the optical characteristics thereof at least in relevant portions on the basis of any appropriate techniques, such as the provision of metal materials or one or more dielectric materials of well known optical behavior. Thereafter, the probe layer 102 may be formed by any appropriate deposition technique, which may include chemical vapor deposition (CVD), physical vapor deposition (PVD), electrochemical deposition techniques, surface treatments, such as oxidation, nitration and the like, while also a combination of two or more of these techniques may be employed to obtain the layer 102 having a specific material composition and thickness. Hence, during the process 103, material may be formed on the substrate 101, which may provide the desired mechanical characteristics, i.e., having a mechanical stability that allows an interaction with a surface portion on the basis of predetermined mechanical down-forces, which may be in the range of 0.1 to several Newton. For example, the thickness 102T of the layer 102 may range from approximately 100 nm to several micrometers, depending on the requirements with respect to mechanical, electrical and thermal characteristics. If a plurality of stacked layers, such as the layers 102A, 102B, 102C are to be provided, respective deposition techniques may be used, for instance, using chemical vapor deposition or physical vapor deposition, for instance in combination with wet chemical deposition recipes, and the like.

Figure 1B:
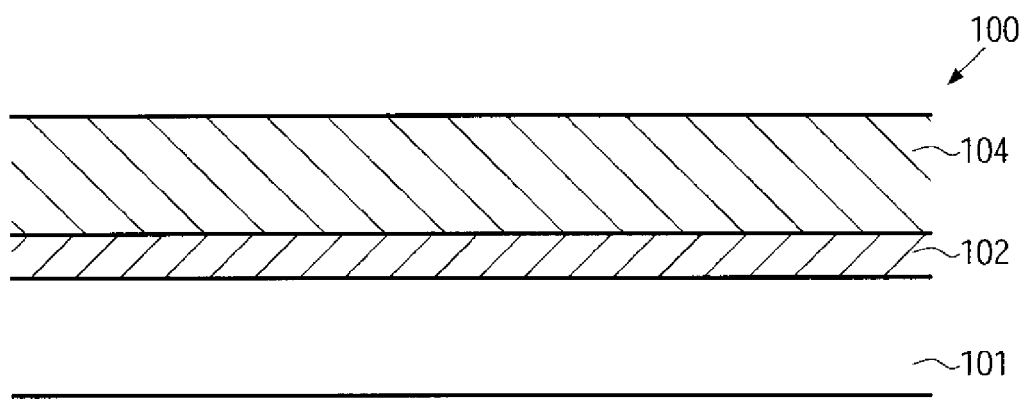

FIG. 1b schematically illustrates the probe 100 in a further advanced manufacturing stage according to one illustrative embodiment, in which an outer contour of a cantilever portion and a tip portion of the probe 100 may be coarsely defined on the basis of lithography and etch techniques. That is, overall dimensions of the layer 102 may be defined by lithography, wherein, in other illustrative embodiments, lithographical processes may also be used for defining laterally adjacent portions of the layer 102, which may have a different material composition, if required. In the embodiment shown, it may be assumed that a strip-like portion of the layer is to be provided to substantially define the lateral dimensions of a cantilever portion and a tip portion of the probe 100. For this purpose, an etch mask 104 may be provided and may be patterned in order to define the lateral dimensions of the layer 102, followed by an appropriately designed etch process for removing exposed portions of the probe layer 102.

Figure 1C:
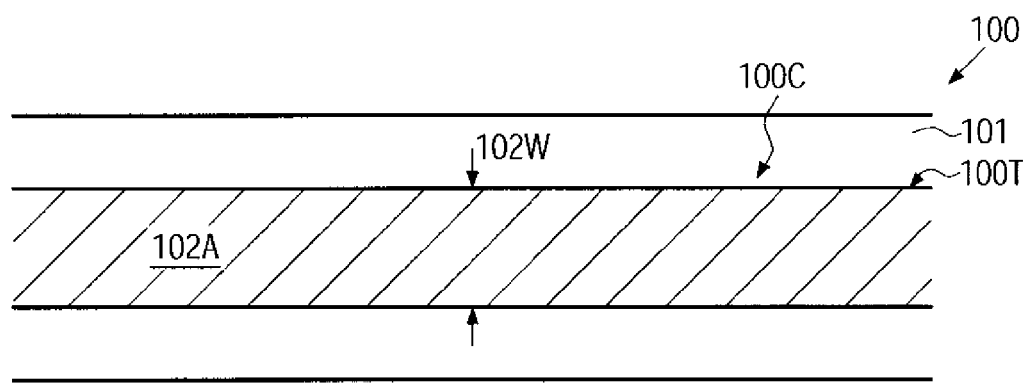
FIGS. 1c-1g schematically illustrate top views of a substrate material and a probe material formed thereon during various manufacturing stages in patterning a tip portion and a cantilever portion, according to still further illustrative embodiments.

FIG. 1c schematically illustrates a top view of the probe 100 after the above-described patterning process. As shown, a layer portion 102A is provided in the embodiment shown as a strip-like region having a substantially constant width 102W. For example, the width 102W may be selected in accordance with mechanical, electrical and thermal characteristics, as previously explained, and may be in the range from several micrometers to several tenths or hundreds of micrometers. For instance, the width 102W may be in the range of approximately 20-200 μm. Thus, the lateral dimension of a cantilever portion 100C and also a tip portion 100T may be defined, wherein, in the embodiment shown, a tapered configuration of the tip portion 100T may not yet be established. In other illustrative embodiments, depending on the capability of the lithography process for forming the mask 104, a certain degree of tapering may be provided in order to coarsely define an apex of the tip portion 100T.

Figure 1D:
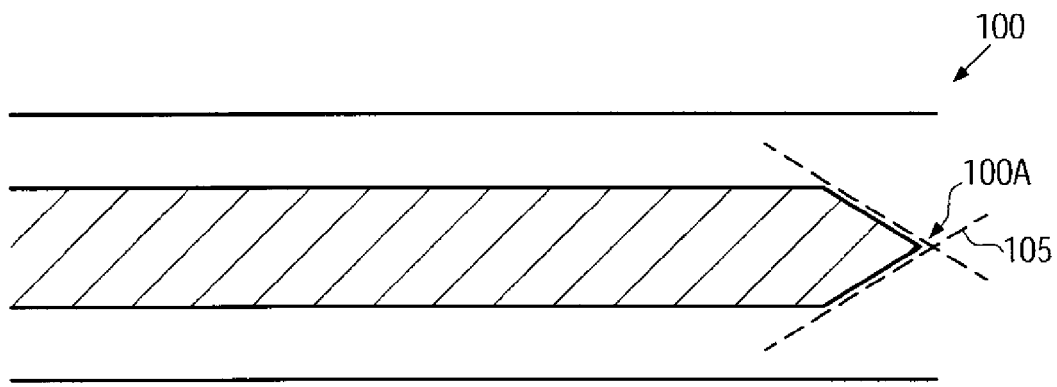

FIG. 1d schematically illustrates the probe 100 in a further advanced manufacturing stage. As shown, the probe 100 may be exposed to a material removal process 105 having a high spatial resolution. In one illustrative embodiment, the process 105 may include a focused ion beam technique, in which a beam of focused ion may be scanned across the tip portion 100T to define an apex 100A by selectively removing material of the layer portion 102A. As previously explained, a focused ion beam technique is a process that is frequently used during the fabrication of microstructure devices and associated analytical techniques, such as scanning electromicroscopy, in which sectional samples may have to be provided with high precision. Thus, during the removal process 105, an appropriate scan scheme may be used to move the focused ion beam across the tip portion 100T at an appropriate angle of incidence, for instance, approximately perpendicular to the drawing plane of FIG. 1d, to thereby selectively remove material with high spatial resolution and define the outer contour of the tip portion 100T.

Figure 1E:
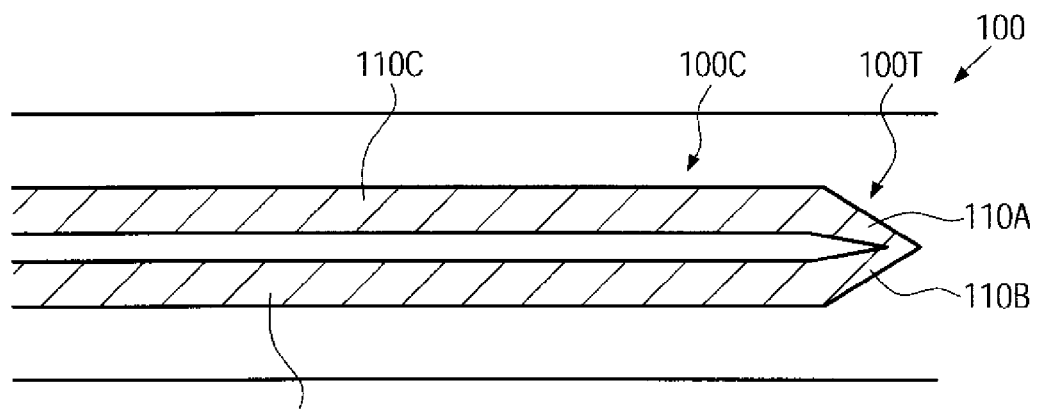

FIG. 1e schematically illustrates the probe 100 according to further illustrative embodiments, when a configuration is required in which a reduced amount of material, at least in the tip portion 100T, may enhance the overall performance of the probe 100. As shown, within the outer contour of the tip portion 100T, and in the embodiment shown also within the outer contour of the cantilever portion 100C, material has been removed, for instance, on the basis of FIB by applying an appropriate scan regime for positioning the focused ion beam at appropriate locations within the tip portion 100T and the cantilever portion 100C to achieve a selective material removal with high spatial resolution. For example, as shown, elongated segments 110A, 110B may be formed within the tip portion 100T, while also respective line segments 110C, 110D may be formed in the cantilever portion 100C. It should be appreciated that any other appropriate profiling of the inner contour of the tip portion and the cantilever portion 100T, 100C may be accomplished on the basis of FIB or any other material removal process having the desired high spatial resolution. In the embodiment shown, the probe 100 may be advantageously used for establishing a current flow through the tip portion 100T, thereby enabling the detection of temperature variations in the tip portion 100T. In other cases, at least the segments 110A and 110B may be comprised of different metallic materials, thereby obtaining a temperature-dependent voltage across the apex 100A.

In other illustrative embodiments, the probe 100 may be used in the configuration for the tip portion 100T and the cantilever portion 100C as shown in FIG. 1d, that is, without an inner contour or structure, wherein, for instance, the layer portion 102A is provided on the basis of a dielectric material, a conductive material and the like. In this case, efficient probes for pure mechanical interaction, electrical interactions and the like may be provided when a reduction of material in the tip portion may not be necessary.

It should further be appreciated that, in other illustrative embodiments, the configuration as shown in FIG. 1e may be obtained on the basis of lithography for forming the segments 110C, 110D, while providing the tip portion 100T in a substantially non-patterned manner, when the final outer contour and an inner structure, if desired, may then be defined by FIB techniques, as previously explained. In other embodiments, the outer and inner contour of the cantilever portion and the tip portion may essentially be defined without conventional lithography, for instance by using FIB techniques, as previously explained.

Figure 1F:
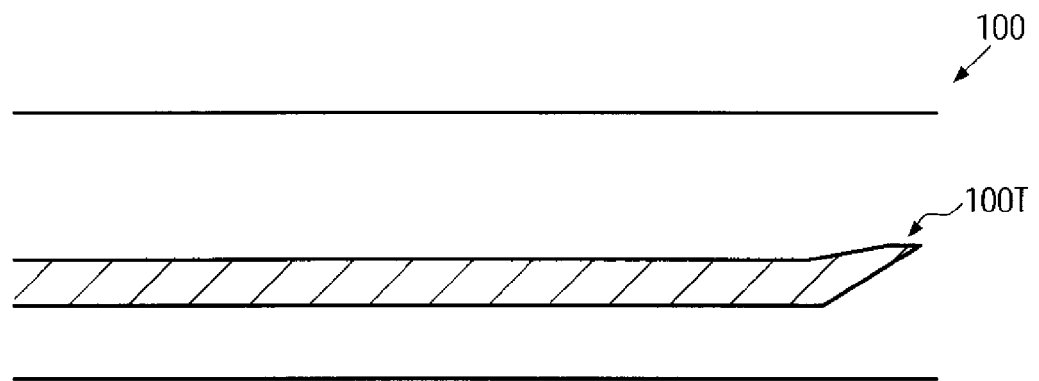

FIG. 1f schematically illustrates a top view of the probe 100 according to another illustrative embodiment, in which the shape of the tip portion 100T may be provided such that it extends laterally from the cantilever portion 100C. Also, in this case, the cantilever portion 100C may be provided as a substantially continuous layer portion, which may be obtained on the basis of lithography techniques, while the precise outer contour of the tip portion 100T may be defined on the basis of FIB, as previously explained. It should be appreciated that the shaping of the cantilever portion 100C and the tip portion 100T as shown in FIGS. 1d-1f is of illustrative nature only, and an appropriate shape of these portions may be accomplished on the basis of FIB, possibly in combination with lithography.

Figure 1G:
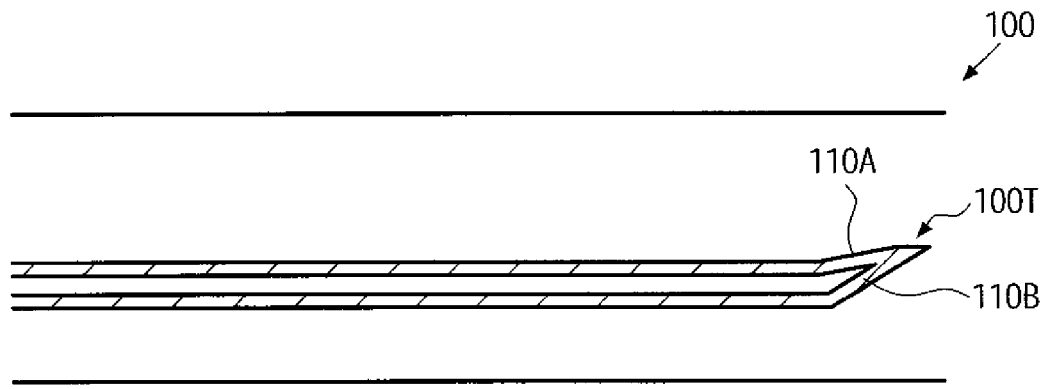

FIG. 1g schematically illustrates a top view of an embodiment of FIG. 1f, wherein material may also have been removed within the outer contour of the tip portion and the cantilever portion 100T, 100C, which may, for instance, be accomplished on the basis of FIB techniques, as explained above.

Figure 1H:
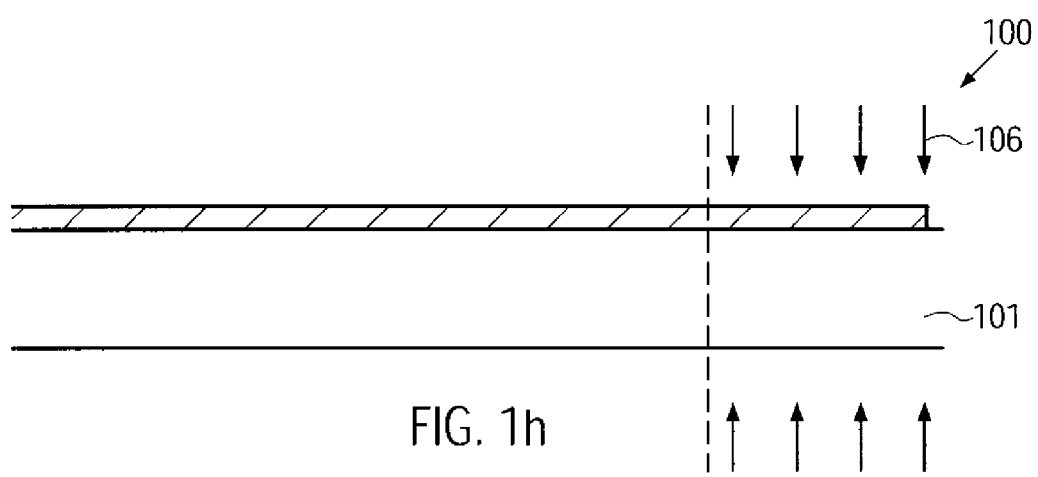
FIGS. 1h-1i schematically illustrate cross-sectional views of a nano-probe during the selective removal of a portion of the substrate material for exposing the cantilever portion and tip portion of the nano-probe, according to still further illustrative embodiments.

FIG. 1h schematically illustrates the probe 100 in cross-sectional view during a selective etch process 106, such as a wet chemical etch process, a plasma-assisted etch process or any combination thereof, in order to remove a portion of the substrate 101 selectively to the cantilever portion and the tip portion 100C, 100T. For this purpose, a plurality of selective etch recipes may be used, wherein, in some illustrative embodiments, the probe 100 may receive, in this manufacturing stage, or may have received in an earlier manufacturing stage, a protective layer to confine the material of the portions 100C, 100T when the etch resistivity of these materials may be considered inappropriate. For example, a silicon dioxide material, silicon nitride material and the like may be formed on exposed portions of the probe 100, while a respective layer may also have been formed prior to the deposition of the probe layer 102 so as to completely enclose the material of the portions 100C, 100T. Since a plurality of highly selective etch recipes are well-established, for instance, with respect to silicon material and the like, respective etch chemistries may be efficiently used during the process 106. It should be appreciated that the etch chemistry of the process 106 may be provided on the basis of a respective etch mask (not shown) that may expose the portions 100C, 100T while in other cases, depending on the overall configuration of the substrate 101, the etch chemistry of the process 106 may be applied in a highly local manner so as to substantially avoid or at least significantly reduce any interaction of the etch chemistry with other areas of the probe 100.

Figure 1I:
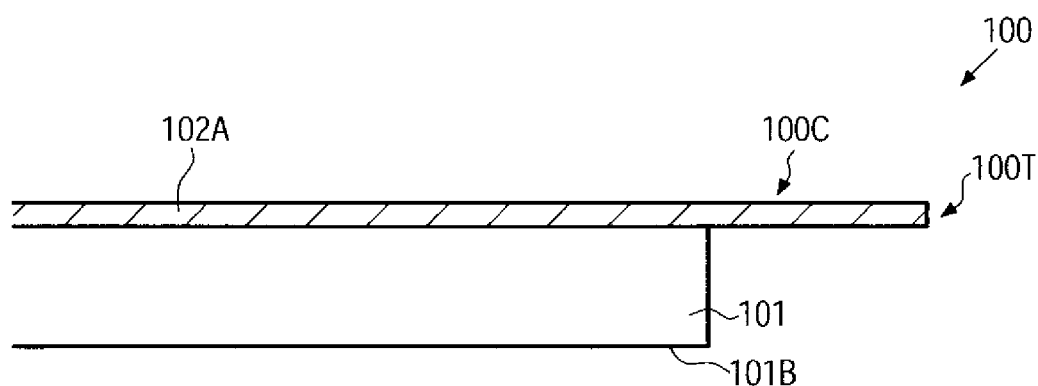

FIG. 1i schematically illustrates the probe 100 in cross-sectional view after the selective etch process 106, possibly in combination with additional etch processes or further etch steps for removing any protective material, which may then be performed with a significantly lower impact on the layer portion 102A compared to the etch process 106, which is designed to remove the substrate material that may have a significantly greater thickness compared to the layer portion 102A. Thus, the probe 100 may in this stage comprise the layer portion 102A formed above the remaining substrate 101, which may provide the desired mechanical and optical characteristics, wherein it should be appreciated that additional process steps may be performed to establish the optical characteristics or enhance the mechanical stability, if required, for instance by the deposition of additional material above the layer portion 102 and/or on a backside 101B of the substrate 101. Furthermore, the cantilever portion 100C may extend from the substrate 101 in a substantially coplanar manner with respect to the layer portion 102A, while the tip portion 100T may be connected to the portion 100C in a substantially coplanar manner, wherein an apex of the tip portion 100T may be defined by the thickness of the layer portion 102A and the previously performed shaping of the tip portion 100T as explained with reference to FIGS. 1d-1g.

Figure 1J:
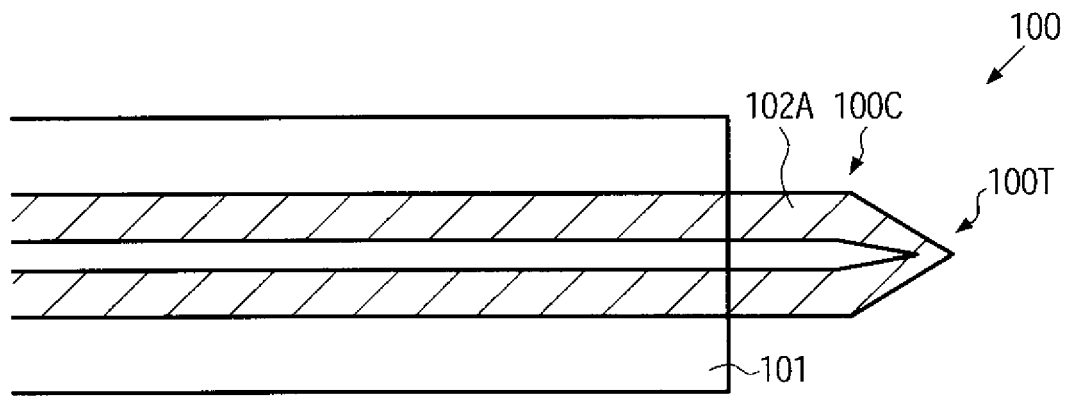
FIG. 1j schematically illustrates a top view of a nano-probe according to one illustrative embodiment.

FIG. 1j schematically illustrates a top view of the probe 100 according to one illustrative embodiment, which substantially corresponds to the embodiment as shown in FIG. 1e. It should be appreciated that the cantilever portion 100C may be considered as a part of the entire cantilever of the probe 100, which may be comprised of the substrate 101 and the layer portion 102A so as to allow mechanical support by a respective tool, such as an AFM and the like, while the cantilever portion 100C is to be understood as the interconnection between a cantilever part, providing mechanical connection to a measurement tool and providing an optical surface portion for reflecting the laser beam, with the tip portion 100T which actually interacts with a surface of interest. Moreover, some of the above-described manufacturing processes may be performed in a different sequence, if desired. For instance, the "fine tuning" of the inner and outer contour of the cantilever portion 100C and the tip portion 100T may be accomplished after the selective etch process 106, for instance on the basis of FIB.

With reference to FIGS. 2a-2k, further illustrative embodiments will now be described, in which a three-dimensional configuration of the cantilever portion and the tip portion may be manufactured on the basis of a three-dimensional structure.

Figure 2A:
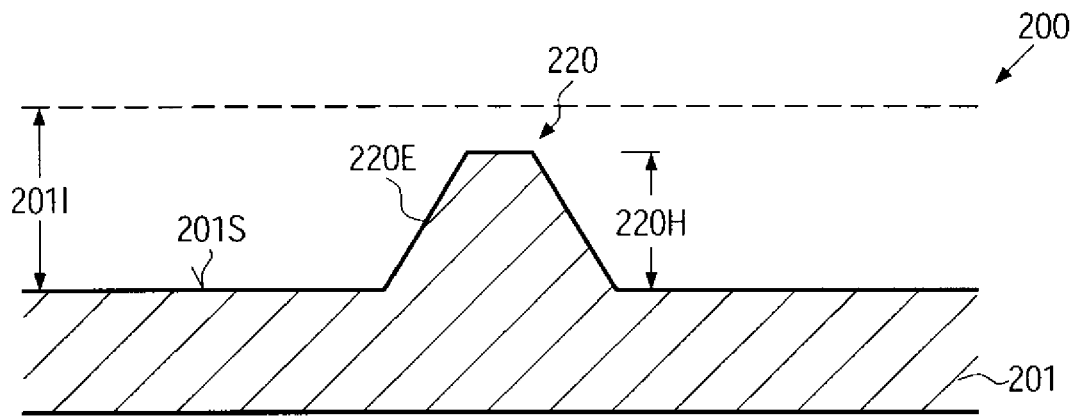
FIG. 2a schematically illustrates a cross-sectional view of a substrate material including a template structure to define a three-dimensional template for a tip portion of a nano-probe, according to a further illustrative embodiment.

FIG. 2a schematically illustrates a cross-sectional view of a probe 200 at an early manufacturing stage. As shown, the device 200 may comprise a substrate 201, which may be appropriate for acting as mechanical support for a cantilever portion, as previously explained. In some illustrative embodiments, the substrate 201 may represent a material having a crystalline structure to enable the creation of a structure by etching on the basis of crystallographic planes in the substrate 201, thereby providing a high degree of process and device uniformity for the device 200. For instance, the substrate 201 may represent a crystalline silicon substrate, which may frequently be used for the fabrication of MEMS devices on the basis of well-established patterning techniques. The substrate 201 may comprise a template structure 220, which, in the embodiment shown, may protrude from a surface 201S of the substrate 201. The template structure 220 may be defined by a plurality of surface portions (not shown in FIG. 2*a*), at least two of which may define an edge 220E, along which a tip portion of the device 200 may extend in a later manufacturing stage. In this sense, the template structure 220 may be considered as a template or mold for the creation of a tip portion, which may be inclined with respect to a cantilever portion to be formed on the substrate surface 201S.

The device 200 as shown in FIG. 2*a* may be formed on the basis of microstructural techniques in which, for instance, the anisotropic etch behavior of different crystallographic planes may be advantageously exploited to obtain the template structure 220 when etching the substrate 201 starting from an initial thickness 201I. In other illustrative embodiments, appropriately selected isotropic etch techniques may be combined with masking regimes to obtain the template structure 220 having desired lateral dimensions and a respective height 220H, which may be in the range from approximately one to several micrometers.

Figure 2B:
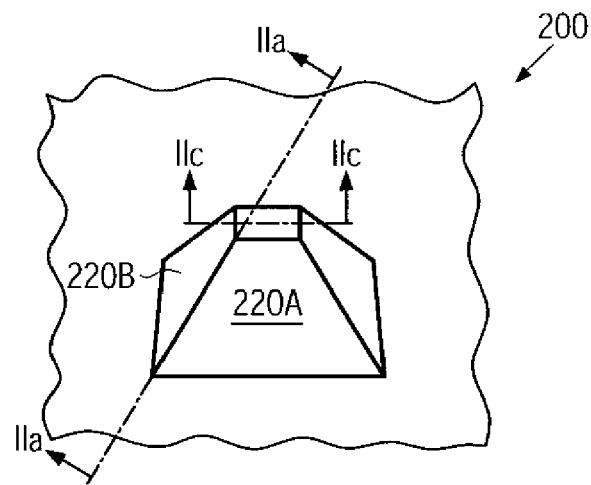
FIG. 2b schematically illustrates a perspective view of the template structure including a plurality of surface portions to define an edge extending from the surface of the substrate material, according to illustrative embodiments.

FIG. 2*b* schematically illustrates a perspective view of the device 200. As shown, the template structure 220, for instance in the form of a pyramid, may extend from the surface 201S wherein respective side surfaces 220A, 220B define the edge 220E under consideration. It should be appreciated that other side surfaces of the pyramid 220 may also define respective edges, which may not be used for formation of the device 200, while, in other cases, at least one further edge defined in the template structure 220 may be used for forming at least one further probe 200.

Based on the configuration of the device 200 as shown in FIG. 2*b*, an appropriate probe material may be deposited, for instance, by CVD, PVD and the like, wherein, with respect to the material characteristics and the configuration of a respective probe layer, the same criteria may apply as previous explained with reference to the probe layer 102.

Figure 2C:
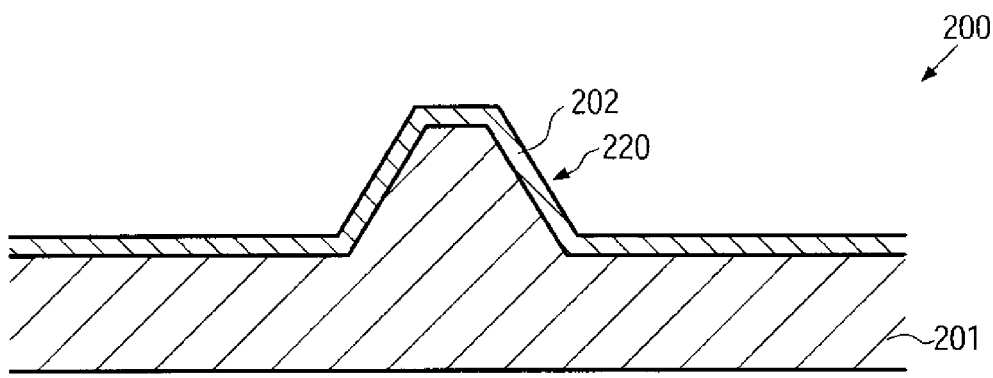
FIGS. 2c-2d schematically illustrate cross-sectional views of the substrate material having formed thereon a probe material and a sacrificial material for patterning the probe material, according to further illustrative embodiments.

FIG. 2*c* schematically illustrates a cross-sectional view along the line IIc, as illustrated in FIG. 2*b*, after the deposition of an appropriate probe material layer 202.

Figure 2D:
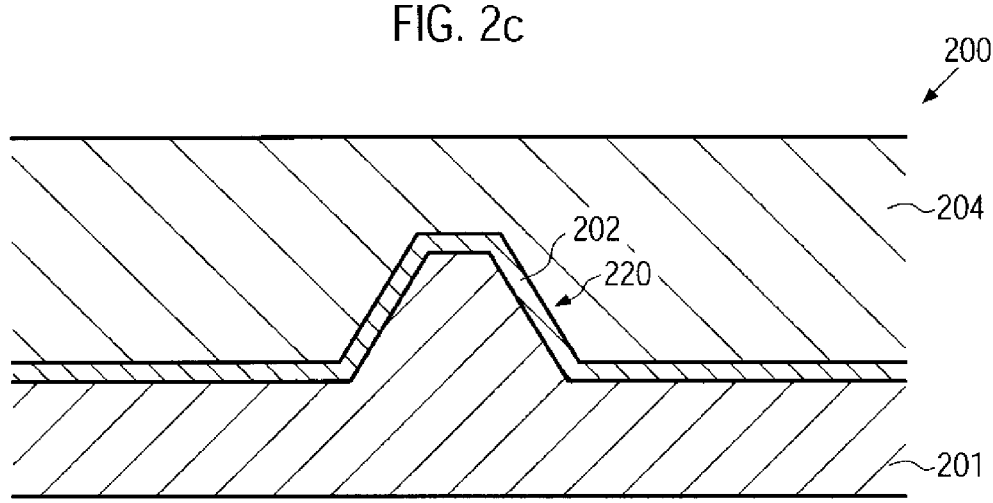

FIG. 2*d* schematically illustrates the device 200 in a further advanced manufacturing stage, in which an etch mask 204, for instance in the form of a resist mask and the like, may be provided to define a cantilever portion and a tip portion in the template structure 220. The etch mask 204 may be formed on the basis of appropriate lithography techniques, for instance, including lithography processes having a deep depth of focus characteristic so as to allow forming an appropriate latent image in a resist material, even for pronounced surface topography, as is generated by the template structure 220. In other illustrative embodiments, the mask 204 may be formed on the basis of conventional lithography techniques, including an appropriate hard mask material, which may be patterned on the basis of highly anisotropic etch recipes so as to expose a desired portion of the layer 202, while covering a portion corresponding to the cantilever portion and the tip portion still to be formed.

Figure 2E:
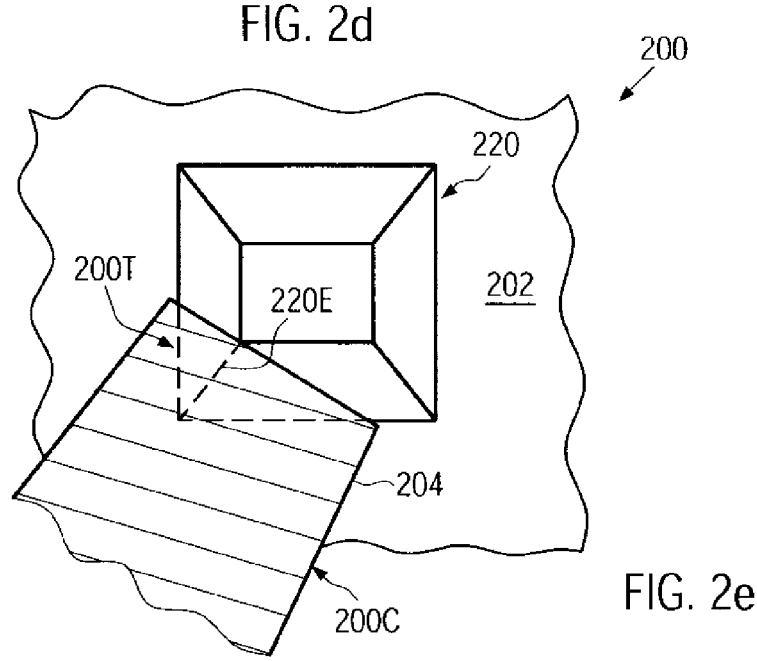
FIG. 2e schematically illustrates a top view of the device of FIG. 2d including a mask for patterning a cantilever portion and a tip portion on the basis of the template structure, according to illustrative embodiments.

FIG. 2*e* schematically illustrates a top view of the device 200 with the etch mask 204, which covers a portion of the layer 202, which corresponds to a cantilever portion 200C. Furthermore, the mask 204 may cover a portion of the structure 220 including the edge 220E, thereby defining a tip portion 200T, which extends from the surface 201S according to the configuration as defined by the template structure 220. The remaining material of the layer 202 may be exposed to an etch ambient for removing material of the layer 202 selectively to the etch mask 204 and the substrate 201. For this purpose, a plurality of well-established etch recipes may be used, as previously explained with reference to the device 100.

Figure 2F:
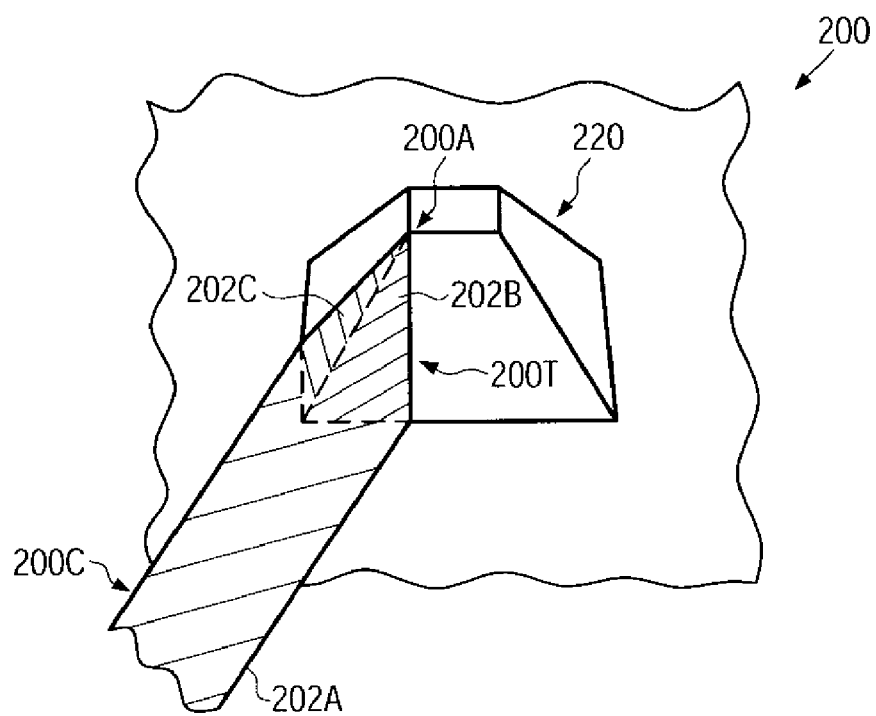
FIG. 2f schematically illustrates a prospective view of the cantilever portion and the tip portion that is still formed on the template structure, according to illustrative embodiments.

FIG. 2*f* schematically illustrates the device 200 in a perspective view after the above-described etch process and after removing the etch mask 204. As shown, a strip-like layer portion 202A may remain on the surface 201S of the substrate 201 and may also extend along the edge 220E as previously explained, thereby providing a tip portion 200T, which extends in a non-planar manner compared to a cantilever portion 200C. Furthermore, an apex 200A may be defined on the edge 220E, the location of which may be defined by the lithographical positioning of the etch mask 204. Moreover, the tip portion 200T may comprise two surface portions 202B, 202C, which are inclined to each other and which are also both inclined with respect to the surface 201S and thus the cantilever portion 200C. It should be appreciated that the surface portions 202B, 202C may also be defined by the position and the dimension of the etch mask 204 and the characteristics of the corresponding etch process in combination with the basic configuration of the template structure 220. Since the template structure 220 may be defined, for instance, by crystal planes and/or well-established etch techniques, the tip portion 200T may be provided with a high degree of process uniformity, thereby enabling the manufacturing of a plurality of portions of very similar characteristics. Furthermore, since the material characteristics may be adjusted on the basis of appropriate deposition techniques, as previously discussed, equivalent probes 200 may be manufactured at moderately low cost on the basis of robust process technology.

In some illustrative embodiments, the device 200 as shown in FIG. 2*f* may be subjected to a selective etch process for removing the template structure 220 and a relevant portion of the substrate 201 to provide the cantilever portion 200C and the tip portion 200T as a free-standing configuration, which may then be used as an appropriate nano-probe. With respect to a corresponding etch process for removing a part of the substrate 201, similar criteria may apply as previously explained. That is, the layer 202 may have been provided with a protective material and may also be capped with appropriate material in the manufacturing stage as shown in FIG. 2*f* so as to impart enhanced integrity to the device 200 during the corresponding etch process. In other cases, a highly selective etch recipe may be used without further protection of the layer portion 202A. Thereafter, the probe 200 may be used in a corresponding measurement tool, such as an AFM, wherein the tip portion 200T may provide enhanced process conditions. For instance, the layer 202 may be provided in the form of a conductive material, thereby enabling electrical and/or thermal interaction with the surface of interest.

In still other illustrative embodiments, the shaping of the layer portion 202A may be accomplished on the basis of patterning strategies, such as FIB, possibly in combination with a lithographical definition of the outer contour of the portion 202A, however, with less restrictive process conditions for the lithography process, since a corresponding "fine tuning" may be accomplished on the basis of the FIB technique that provides enhanced spatial resolution.

Figure 2G:
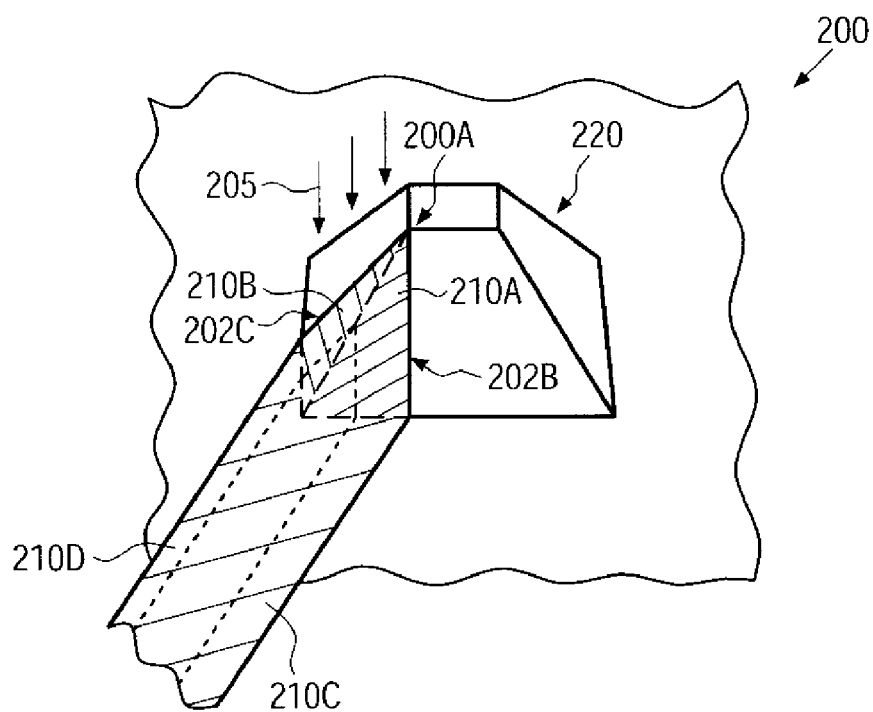
FIG. 2g schematically illustrates a perspective view during a further patterning process, for instance, performed on the basis of an FIB for removing material from a central portion of the tip, according to still further illustrative embodiments.

FIG. 2*g* schematically illustrates the device 200 according to still further illustrative embodiments, in which a material removal process 205, for instance on the basis of FIB or any other technique having enhanced spatial resolution, may be used to modify the structure of the layer portion 202A in order to adjust the overall characteristics of the probe 200. For instance, in the tip portion 200T, a significant amount of material may be removed in the center thereof in order to adjust the electrical and thermal characteristics of the tip portion 200T, as previously discussed. Similarly, the configuration of the cantilever portion 200C may be adapted to the device requirements, wherein, in other illustrative embodiments, a corresponding patterning of the two-dimensional cantilever portion 200C may also be accomplished by using standard lithography techniques, depending on lateral dimensions involved. For example, elongated layer portions 210B, 210A may be defined on the basis of the process 205 and respective elongated layer portions 210C, 210D may be formed in the cantilever portion 200C. In this manner, a current flow may be established through the tip portion 200T, as previously explained, thereby providing an efficient transducer structure for electrical and/or thermal measurements. It should be appreciated, however, that, during the removal process 205, any desired configuration of the tip portion and/or the cantilever portion 200T, 200C may be accomplished, depending on the spatial resolution capabilities of the process 205.

After defining the final configuration of the tip portion 200T and the cantilever portion 200C, a portion of the substrate 201 and the template structure 220 may be removed, as explained before, and the probe may be used in this configuration for mechanical probing, electrical probing, when using a conductive material for the tip portion 200T, or for thermal probing, when a further material removal from within the tip portion 200T may not be required. In other illustrative embodiments, the "fine-tuning" of the portion 200T, possibly in combination with the fine-tuning of the portion 200C, may be performed after the removal of the template structure 220.

Figure 2H:
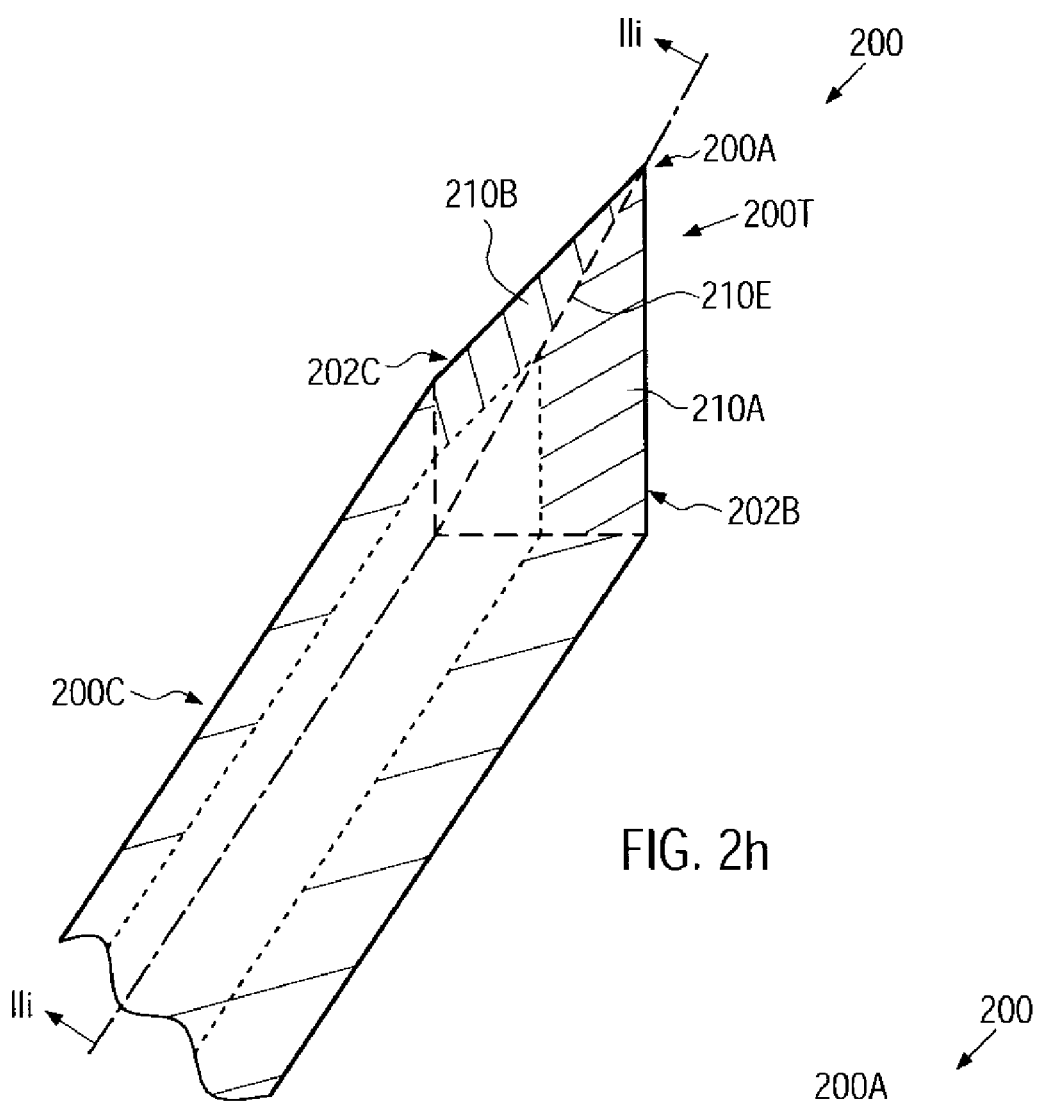
FIG. 2h schematically illustrates the cantilever portion and the tip portion after the selective removal of a portion of the substrate material including the template structure, according to still further illustrative embodiments.

FIG. 2h schematically illustrates a perspective view of the probe 200 after the above-described partial removal of the substrate 201 and the template structure 220. Thus, the tip portion 200T may comprise the surface portions 202B, 202C, or the respective elongated segments 210A, 210B formed therefrom when material removal in the tip portion is desired due to sophisticated thermal sensing applications, that are inclined to each other thereby forming a sharp free-standing edge 210E at the end of which is located the apex 200A. Since the edge 210E, as well as the inclination of the surface portions 202B, 202C, is defined by the template structure 220, a desired degree of "sharpness" may be obtained with a high degree of process uniformity. Furthermore, the layer portions 202B, 202C or the segments 210A, 210B, if material has been removed from the inner portion of the tip portion 200T as indicated by the dashed lines, may extend from the cantilever portion 200C according to a well-defined angle, thereby providing a three-dimensional configuration.

Figure 2I:
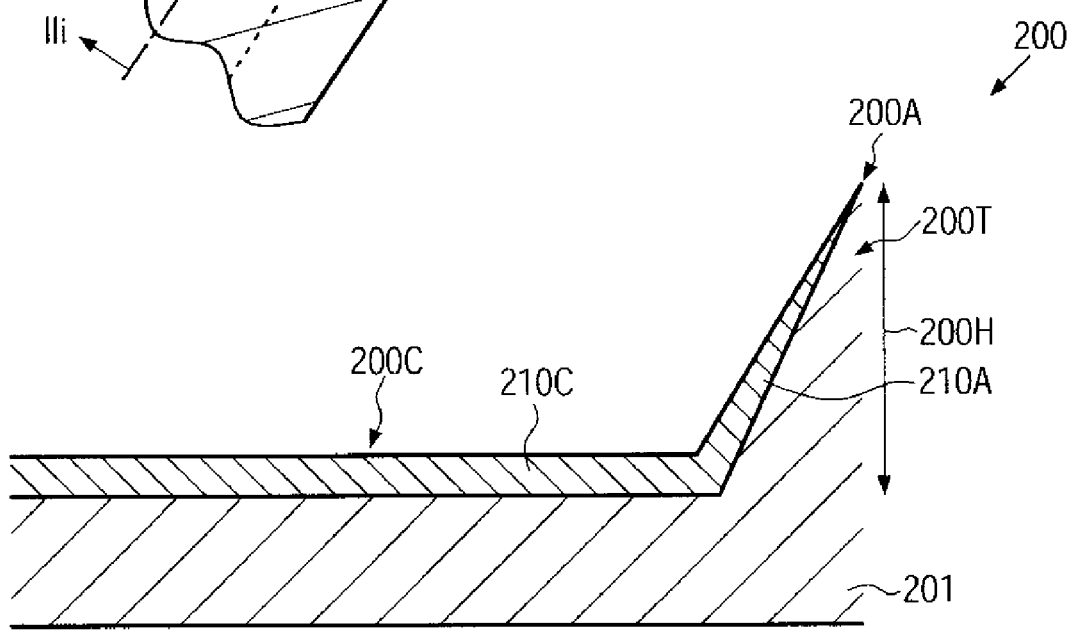
FIG. 2i schematically illustrates a cross-sectional view of the cantilever portion and the tip portion after the removal of the template structure.

FIG. 2i schematically illustrates a cross-sectional view of the probe 200, i.e., of the cantilever portion 200C and the tip portion 200T. Thus, as shown, the height 200H of the apex 200A with respect to the cantilever portion 200C, as well as the amount of material in the tip portion 200T and the configuration thereof, may be adjusted on the basis of uniform and reliable process techniques, wherein even a plurality of different probe characteristics may be adjusted on the basis of the same template structure by using different materials, a different thickness for the layer 202 and a different amount of material removal during the process 205. Furthermore, due to the three-dimensional nature of the probe 200, a mechanical interaction may be efficiently translated into transversal oscillations of the cantilever portion 200C, the mechanical response of which may therefore be efficiently adjusted by a lateral dimension of the layer portion 202A, that is, the spring constant of the cantilever portion 200C may be efficiently selected by adjusting one or more of the before-mentioned parameters. Furthermore, the material characteristics in the cantilever portion 200C may be selected differently with respect to the tip portion 200T by, for instance, forming an additional material layer on the cantilever portion 200C, for instance to enhance the mechanical and/or chemical stability thereof.

Figure 2J:
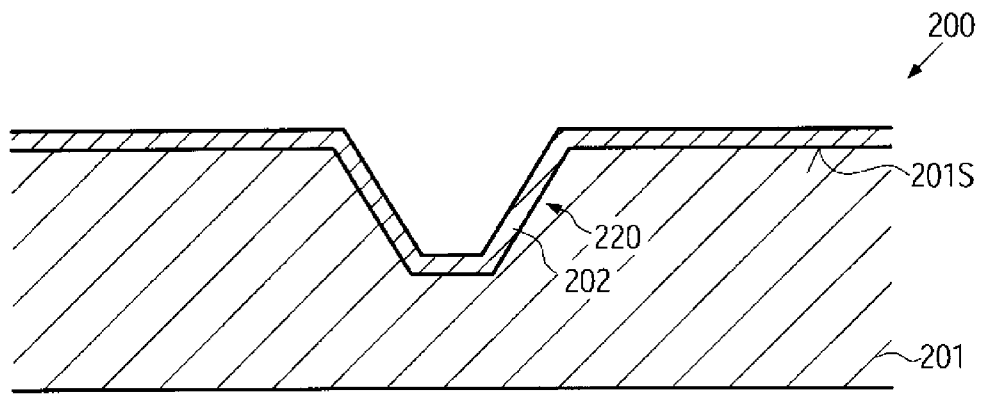
FIGS. 2j-2k schematically illustrate cross-sectional views of a nano-probe during various manufacturing stages when forming the tip portion on the basis of a template structure provided in the form of a recess in the substrate material, according to yet other illustrative embodiments.

FIG. 2j schematically illustrates the probe 200 according to further illustrative embodiments, in which the template structure 220 may extend from the surface 201 in a "negative" direction, i.e., a template structure 220 may be provided as a recess, which may be formed on the basis of similar process techniques, as previously described with reference to the template structure 220 as shown in the preceding figures. For example, the recess 220 may represent an inverse "replication" of the mesa structure as shown in FIG. 2a. Consequently, the probe layer 202 may be formed on the surface 201S and within the recess 220, which may be accomplished on the basis of the same process techniques as previously described. Thereafter, the further processing may be continued in a similar manner as described above to define the cantilever portion 200C and the tip portion 200T as a three-dimensional configuration.

Figure 2K:
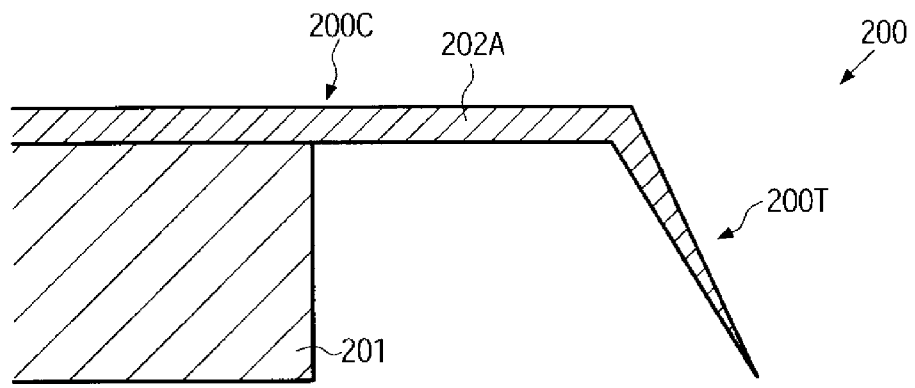

FIG. 2k schematically illustrates the probe 200 in an advanced manufacturing stage, in which the layer portion 202A has been patterned into the cantilever portion 200C, which may extend from the substrate 201 which may be appropriately dimensioned to act as a mechanical interface for connecting to a respective apparatus, such as an AFM tool, and also provide the desired optical characteristics with respect to reflectivity, as previously discussed. Furthermore, the tip portion 200T may extend from the cantilever portion 200C under a specified angle and may comprise the inclined surface portions 202B, 202C or respective portions 210A, 210B formed therefrom which may be inclined to each other, as previously explained.

As a result, the subject matter disclosed herein provides enhanced manufacturing techniques and respective nanoprobes, in which a high degree of flexibility in adjusting the mechanical, electrical, thermal and other characteristics may be achieved by forming a probe material layer on an appropriate substrate and by subsequently patterning the probe material layer to define at least an outer contour or shape of a cantilever portion and a tip portion. In some illustrative embodiments, a two-dimensional configuration may be accomplished by sophisticated patterning techniques, for instance on the basis of FIB techniques, by which the geometrical configuration of the tip portion may be defined with enhanced reliability and uniformity, while additionally a layer thickness and the material composition of the probe layer may also be used for adjusting the desired overall tip characteristics. Similarly, a three-dimensional configuration may be obtained on the basis of a template structure, which may be subsequently coated by an appropriate probe material that may then be patterned on the basis of lithography and/or FIB. Hence, appropriate probes may be provided, even for sophisticated applications, such as thermal nano-probes, while nevertheless providing a high degree of process uniformity during the fabrication of the nano-probes for many different applications due to the usage of well-established microstructural manufacturing techniques. Thus, sophisticated measurement techniques may be established for advanced thermal scanning, strain measurement techniques and the like, in which a thermal and/or electrical interaction with the surface under consideration at nano dimensions is required. These techniques may be advantageously used for failure localization and local analysis during the fabrication of advanced integrated circuits.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising: providing a substrate having a surface for forming a cantilever portion thereon, said substrate further comprising a template structure extending from said surface, said template structure defining a template edge extending from said surface; forming a probe material above said surface and said template structure; patterning said probe material to form a cantilever portion on a part of said surface and to form a tip portion on a part of said template structure, said tip portion being connected to said cantilever portion, said tip portion extending along said template edge defined by said template structure, wherein patterning said probe material comprises defining an outer contour of said tip portion and removing material from an area within said outer contour of said tip portion to define two elongated segments in said tip portion, thereby forming a tip edge, wherein an apex is located at an end of said tip edge and said two elongated segments are connected to one another at said apex; and selectively removing said template structure and a part of said substrate corresponding to said cantilever portion.

2. The method of claim 1, wherein patterning said probe material comprises performing a lithography process to define said outer contour of said tip portion and an outer contour of said cantilever portion.

3. The method of claim 2, wherein patterning said probe material comprises using a focused ion beam to define at least said outer contour of said tip portion.

4. The method of claim 1, wherein said material is removed by using a focused ion beam.

5. The method of claim 1, further comprising using a focused ion beam to form at least said tip portion.

6. The method of claim 4, wherein said material is removed after selectively removing said template structure.

7. The method of claim 1, wherein said template structure is provided as a recess in said substrate.

8. The method of claim 1, wherein said template structure is provided as a structure protruding from said surface.

* * * * *